US011249803B2

(12) United States Patent
Yang et al.

(10) Patent No.: US 11,249,803 B2
(45) Date of Patent: Feb. 15, 2022

(54) USECASE SPECIFICATION AND RUNTIME EXECUTION

(71) Applicant: NEC Laboratories America, Inc., Princeton, NJ (US)

(72) Inventors: Yi Yang, Princeton, NJ (US); Kunal Rao, Monroe, NJ (US); Srimat Chakradhar, Manalapan, NJ (US); Giuseppe Coviello, Princeton, NJ (US); Min Feng, Monmouth Junction, NJ (US); Murugan Sankaradas, Dayton, NJ (US)

(73) Assignee: NEC Corporation

( * ) Notice: Subject to any disclaimer, the term of this patent is extended or adjusted under 35 U.S.C. 154(b) by 71 days.

(21) Appl. No.: 16/809,154

(22) Filed: Mar. 4, 2020

(65) Prior Publication Data

US 2020/0293371 A1   Sep. 17, 2020

Related U.S. Application Data

(60) Provisional application No. 62/816,427, filed on Mar. 11, 2019.

(51) Int. Cl.
*G06F 9/48* (2006.01)
*G06F 9/46* (2006.01)

(52) U.S. Cl.
CPC ........... *G06F 9/4887* (2013.01); *G06F 9/46* (2013.01); *G06F 9/461* (2013.01); *G06F 9/48* (2013.01); *G06F 9/485* (2013.01); *G06F 9/4806* (2013.01); *G06F 9/4843* (2013.01); *G06F 9/4881* (2013.01)

(58) Field of Classification Search
CPC ... G06F 9/46; G06F 9/461; G06F 9/48; G06F 9/4806; G06F 9/4843; G06F 9/485; G06F 9/4881; G06F 9/4887
See application file for complete search history.

(56) References Cited

U.S. PATENT DOCUMENTS

| 2007/0156487 | A1* | 7/2007 | Sanabria | G06F 9/546 |
| | | | | 705/7.26 |
| 2013/0275969 | A1* | 10/2013 | Dimitrov | G06F 8/61 |
| | | | | 718/1 |
| 2015/0301870 | A1* | 10/2015 | Gehin | G06Q 10/063 |
| | | | | 718/106 |

(Continued)

OTHER PUBLICATIONS

Chardet et al., "Madeus: A formal deployment model", 2018 International Conference on High Performance Computing & Simulation (HPCS). Jul. 16, 2018. (pp. 724-731.).

(Continued)

*Primary Examiner* — Charles M Swift
(74) *Attorney, Agent, or Firm* — Joseph Kolodka

(57) ABSTRACT

A computer-implemented method includes obtaining a usecase specification and a usecase runtime specification corresponding to the usecase. The usecase includes a plurality of applications each being associated with a micro-service providing a corresponding functionality within the usecase for performing a task. The method further includes determining that at least one instance of the at least one of the plurality of applications can be reused during execution of the usecase based on the usecase specification and the usecase runtime specification, and reusing the at least one instance during execution of the usecase.

15 Claims, 9 Drawing Sheets

(56) References Cited

U.S. PATENT DOCUMENTS

2017/0132037 A1* 5/2017 Sevigny .............. G06F 9/4881
2018/0150495 A1   5/2018 Hoff et al.
2020/0057675 A1* 2/2020 Dias .................. G06F 9/48
2020/0120000 A1* 4/2020 Parthasarathy ........ G06N 20/00

OTHER PUBLICATIONS

DiCosmo et al., "Aeolus: A component model for the cloud", Information and Computation. Dec. 1, 2014. vol. 239. (pp. 100-121.).

Khoonsari et al., "Interoperable and scalable data analysis with microservices: applications in metabolomics", Bioinformatics. vol. 35, Issue 19. Oct. 1, 2019 (pp. 3752-3660.).

* cited by examiner

800

Obtain a usecase specification and a usecase runtime specification corresponding to a usecase, the usecase including a plurality of applications each being associated with a micro-service providing a corresponding functionality within the usecase for performing a task
810

Determine that at least one instance of the at least one of the plurality of applications can be reused during execution of the usecase based on the usecase specification and the usecase runtime specification
820

> Determine that an instance configuration from the specifications matches at least one existing instance of the plurality of applications
> 822
>
> Determine that the instance configuration and an instance node/machine configuration from the specifications matches the at least one existing instance
> 824
>
> Determine that the at least one instance of the at least one application already exists
> 826

Reuse the at least one existing instance during execution of the usecase
830

FIG. 8

USECASE SPECIFICATION AND RUNTIME EXECUTION

RELATED APPLICATION INFORMATION

This application claims priority to provisional application Ser. No. 62/816,427, filed on Mar. 11, 2019, incorporated by reference herein in its entirety.

BACKGROUND

Technical Field

The present invention relates to computer applications, and more particularly to reusing application instances during usecase runtime execution.

Description of the Related Art

Applications can act as micro-services providing specific functionalities used to solve problems. An application instance, or instance, can be generated and run, which provides the micro-service associated with the application. If needed, multiple instances of the application can be generated that each process different input data.

SUMMARY

According to an aspect of the present invention, a computer-implemented method is provided. The computer-implemented method includes obtaining a usecase specification and a usecase runtime specification corresponding to the usecase. The usecase includes a plurality of applications each being associated with a micro-service providing a corresponding functionality within the usecase for performing a task. The method further includes determining that at least one instance of the at least one of the plurality of applications can be reused during execution of the usecase based on the usecase specification and the usecase runtime specification, and reusing the at least one instance during execution of the usecase.

In accordance with another embodiment of the present invention, a system is provided. The system includes a memory device for storing program code and at least one processor device operatively coupled to the memory device. The at least one processor device is configured to execute program code stored on the memory device to obtain a usecase specification and a usecase runtime specification corresponding to the usecase. The usecase includes a plurality of applications each being associated with a micro-service providing a corresponding functionality within the usecase for performing a task. The at least one processor device is further configured to execute program code stored on the memory device to determine that at least one instance of the at least one of the plurality of applications can be reused during execution of the usecase based on the usecase specification and the usecase runtime specification, and reuse the at least one instance during execution of the usecase.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 8 is a block/flow diagram of a system/method for reusing or sharing application instances, in accordance with an embodiment of the present invention;

DETAILED DESCRIPTION OF PREFERRED EMBODIMENTS

The embodiments described herein provide for a runtime system that can combine a plurality of applications associated with respective micro-services as "building blocks" into a single entity, referred to herein as a usecase, to perform a task (e.g., a higher-level real-time task) and/or solve a complex problem upon execution. Each micro-service may provide a corresponding functionality within the usecase, and an application instance can be generated and/or run to provide the corresponding micro-service. Since multiple instances of an application can be generated, if required, the usecase can perform a task or solve a problem that is a much larger than what each individual application of the usecase can solve. A usecase in accordance with the embodiments described herein can be run on, e.g., an edge device, a server, a cloud device, or any combination thereof.

Figure 1:
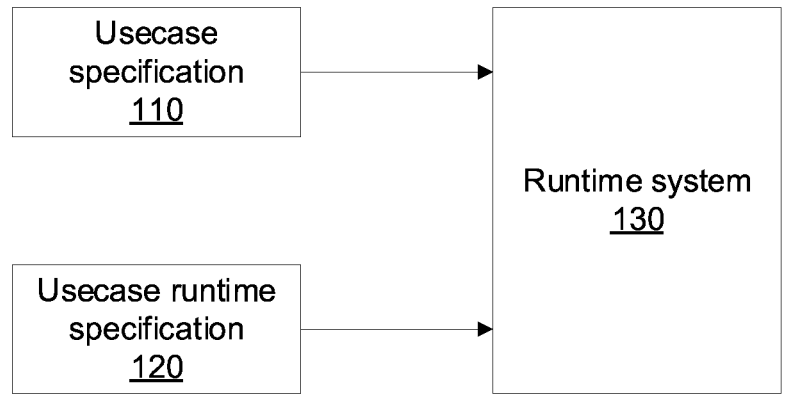
FIG. 1 is a diagram of a high-level overview of a system/method for specifying a usecase specification, a usecase runtime specification, and managing usecase execution, in accordance with an embodiment of the present invention.

Referring now in detail to the figures in which like numerals represent the same or similar elements and initially to FIG. 1, a block/flow diagram is provided illustrating a high level overview of a system/method 100 for specifying a usecase specification, a usecase runtime specification, and managing usecase execution.

As shown, a usecase specification 110 and a usecase runtime specification 120 are obtained by a runtime system 130.

As will be described in further detail below with reference to FIG. 2, the usecase specification 110 may specify usecase details including, but not limited to, applications that are included in the usecase, instances for execution of the usecase, how the instances should be spawned, connections between the various instances, configuration of individual instances and nodes/machines on which they should run, etc.

As will be described in further detail below with reference to FIG. 3, the usecase runtime specification 120 may specify details regarding the execution of a usecase including, but not limited to, a usecase identifier (ID) for the instance of the usecase that needs to be generated, a unique name of the usecase instance, a node/machine which initiates execution of the usecase, and a configuration for the entire usecase.

The runtime system 130 can manage execution of the usecase based on the specifications 110 and 120. The runtime system 130 can manage execution of individual applications by combining or stitching multiple micro-services in a manner such that a larger problem can be solved by solving smaller problems with the individual applications working together and talking to each other. The runtime system 130 can cleanly stop and terminate execution of the entire usecase, including its child instances and any connections between them.

Additionally, the runtime system 130 can provide fault tolerance in the event of abrupt disruption of usecase execution. More specifically, if for any reason the usecase execution abruptly stops or fails (e.g., power goes down), then, when the runtime system comes back up, the runtime system does not need to generate duplicate child instances. Instead, the runtime system can resume operation by reusing previously existing instances.

Further details regarding management of usecase execution by the runtime system 130 will be described below with reference to FIG. 4.

Figure 2:
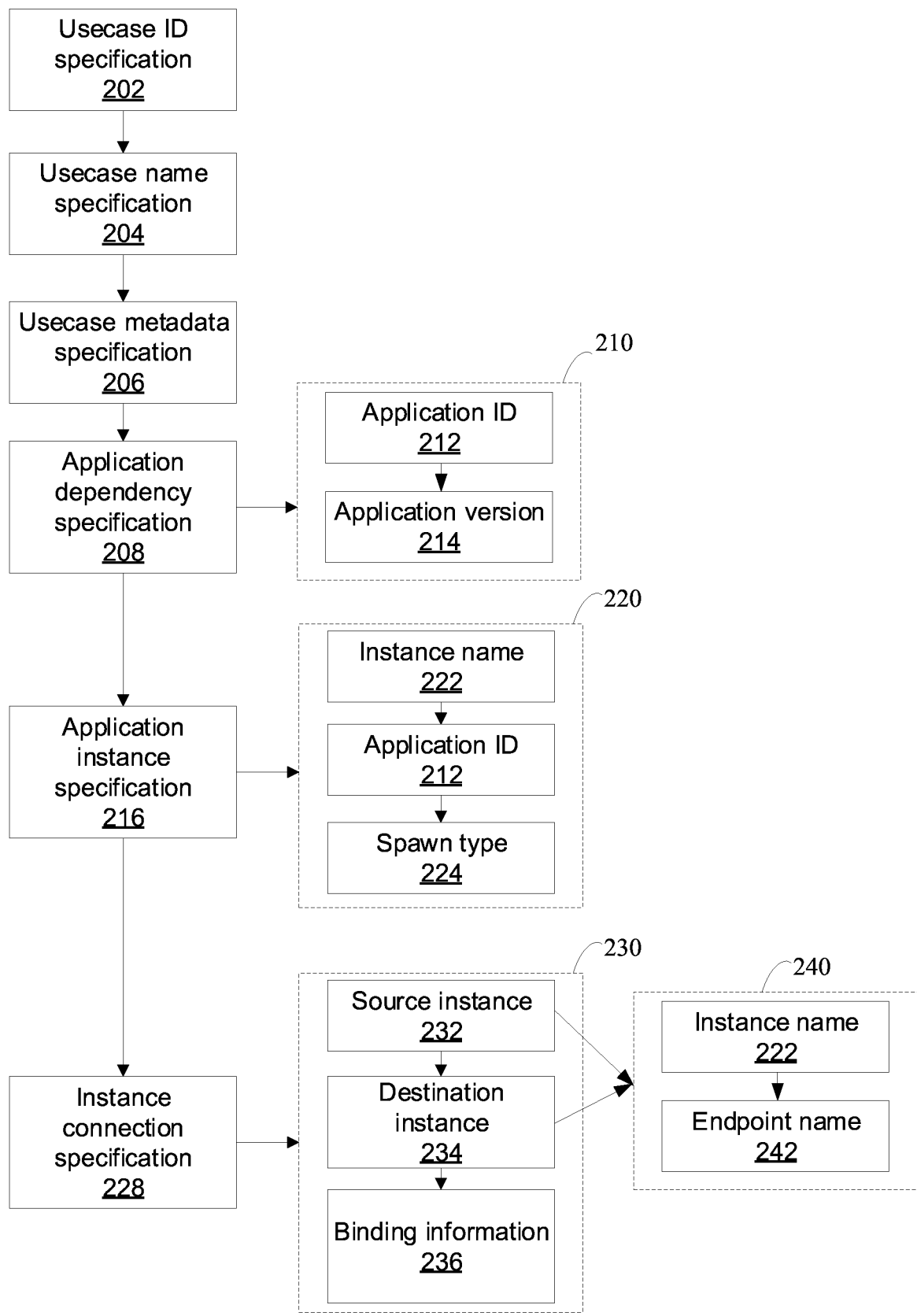
FIG. 2 is a diagram of a usecase specification, in accordance with an embodiment of the present invention.

With reference to FIG. 2, a diagram is provided illustrating a usecase specification 200. As described above, the usecase can include a plurality of applications associated with respective micro-services to perform a task. Each micro-service may provide a corresponding functionality, and an instance of an application can be generated and/or run to provide the corresponding micro-service.

The usecase specification 200 may specify usecase details including, but not limited to, applications that are included in the usecase, instances for execution of the usecase, how the instances should be spawned, connections between the various instances, configuration of individual instances and nodes/machines on which they should run, etc.

More specifically, as shown in FIG. 2, the usecase specification 200 can include a usecase identifier (ID) specification 202 specifying a usecase ID for a usecase, a usecase name specification 204 specifying a name for the usecase, and a usecase metadata specification 206 specifying other metadata related to the usecase.

The usecase ID can be used internally to refer to the usecase, which can include a plurality of applications. The other metadata can include the version number of the usecase, any description associated with the usecase, a universal resource identifier (URI) or universal resource locator (URL) where more details related to the usecase can be found, the operating system (OS) and architecture on which the usecase runs, the maintainer of the usecase, and any other relevant metadata pertaining to the usecase.

The usecase specification 200 can further include application dependency specification 208. As mentioned above, the usecase can include a plurality of applications. The applications that constitute the usecase can be specified after the usecase ID, usecase name and usecase metadata are provided.

Each application can be associated with a set of application metadata 210. As shown, the set of application metadata 210 can include an application ID 212 that internally refers to the application, and an application version 214 that corresponds to the version of the application that is used as part of the usecase.

An application can include one or more instances that run and provide the corresponding micro-service(s) for which the application is designed. The usecase specification 200 can further include an application instance specification 216 specifying the one or instances of the application. There can be a plurality of instances of an application, if the usecase requires them. Each instance of an application may act upon different input data.

Each instance can be associated with a set of instance metadata 220. The set of instance metadata 220 can include an instance name 222, the application ID 212 to which the instance belongs to, and a spawn type 224 of the instance. The spawn type 224 refers to the way the runtime system should generate and spawn the corresponding instance.

One of a plurality of spawn types can be specified for an instance. Non-limiting examples of spawn types that can be specified for an instance include "New", "Reuse", "Dynamic", "UniqueSiteWide", and "UniqueNodeWide".

If the New spawn type is specified for an instance, the runtime system will always generate a new instance.

If the Reuse spawn type is specified for an instance, the runtime system will first check if there are any other instances already running with the same configuration. If so, the runtime system will reuse that instance during execution of the usecase. Otherwise, a new instance can be generated by the runtime system.

If the Dynamic spawn type is specified for an instance, the runtime system will not generate the instance when the usecase starts. Instead, the instance will be dynamically generated on-demand after the usecase execution has begun.

If the UniqueSiteWide spawn type is specified for an instance, the runtime system will generate a single instance across the entire site wide deployment. If an instance is already running, then the runtime system will use that instance during execution of the usecase. Otherwise, a new instance is generated and started.

If the UniqueNodeWide spawn type is specified for an instance, the runtime system will generate a single instance on the particular node/machine where the instance will be run. The node/machine may be specified during execution of the usecase. If there is another instance already running on the specified node/machine that matches the instance configuration, the runtime system will use that instance during execution of the usecase. Otherwise, a new instance is generated and started.

The usecase specification 200 can further include an instance connection specification 128 specifying connections between various instances of the applications. The connections can define the way micro-services connect and talk to each other, such that output provided by a particular micro-service is passed on as input to the next micro-service. Various micro-services may be connected, and a topology of these micro-services may be generated, thereby forming the entire usecase.

Each connection can be associated with a set of connection metadata 230. The set of connection metadata 230 can include a source instance 232, a destination instance 234, and binding information 236. Communication between instances may be done over a suitable message queue and/or over application programming interfaces (APIs) (e.g., HTTP (S)-based RESTful APIs), where the binding information 236 can tell the runtime system which instance binds and which instance needs to connect and obtain the necessary input data.

For example, one suitable message queue is be provided by ZeroMQ, which is an open-source high-performance asynchronous messaging library. Unlike message-oriented middleware, ZeroMQ can be run without a dedicated message broker. For the source instance 232 and the destination instance 234, the instance name 222 and the endpoint name 242 to be used during connection can be specified.

Accordingly, the usecase specification 200 described above can be used to identify various applications, their instances and connections that need to be made across various instances for the entire usecase to build and run.

The usecase specification 200 can be used as an input to compile the usecase and generate a binary package of the usecase. To generate the binary package, each application in the usecase can be compiled one-by-one to generate its binary package based on the set of application metadata 210 (e.g., application ID 212 and application version 214).

A unified configuration of the usecase can be generated as a combination of the configuration of each instance to be launched in runtime based on the set of instance metadata 220 (e.g., instance name 222, application ID 212 and spawn type 224).

A sample configuration of the usecase can be generated as a combination of the sample configuration of each instance to be launched in runtime based on the set of instance metadata 220 (e.g., instance name 222, application ID 212 and spawn type 224).

A package of the usecase including the binary packages, unified configuration and the sample configuration can be generated.

Figure 3:
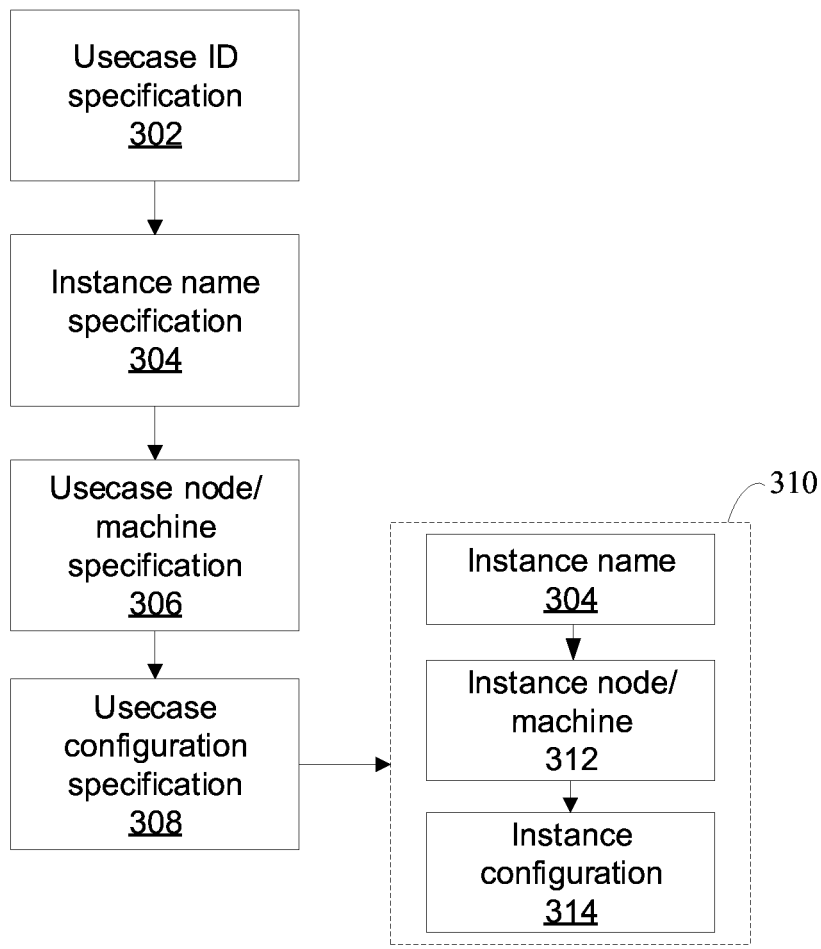
FIG. 3 is a diagram of a usecase runtime specification, in accordance with an embodiment the present invention.

With reference to FIG. 3, a diagram is provided illustrating a usecase runtime specification 300. The usecase runtime specification 300 may specify details regarding the execution of a usecase.

More specifically, as shown, the usecase runtime specification 300 can include a usecase identifier (ID) specification 302 that specifies the usecase ID for the instance of the usecase that needs to be generated, an instance name specification 304 that specifies the unique name of the usecase instance, a usecase node/machine specification 306 that specifies the node/machine which initiates execution of the usecase, and a usecase configuration specification 308 that specifies the configuration for the entire usecase.

The usecase configuration specification 308 can be associated with the configuration for each instance belonging to the usecase. For example, the configuration of each instance can be based on a set of configuration metadata 310 include the instance name 304, the instance node/machine 312 on which the instance needs to be started, and the instance configuration 314 of the instance itself.

The usecase runtime specification 300 can override a default usecase configuration (which combines the default configuration of individual application instances) and the node on which the usecase instance needs to run. If this configuration is not provided by the usecase runtime specification, the runtime system can use the default usecase configuration, and a default node to run the usecase.

Once a runtime system has the usecase specification and the usecase runtime specification, such as those described above with reference to FIGS. 1-3, the runtime system can commence a runtime execution procedure for building, generating and executing the usecase. Further details regarding the runtime execution procedure will now be described below with reference to FIG. 4.

Figure 4:
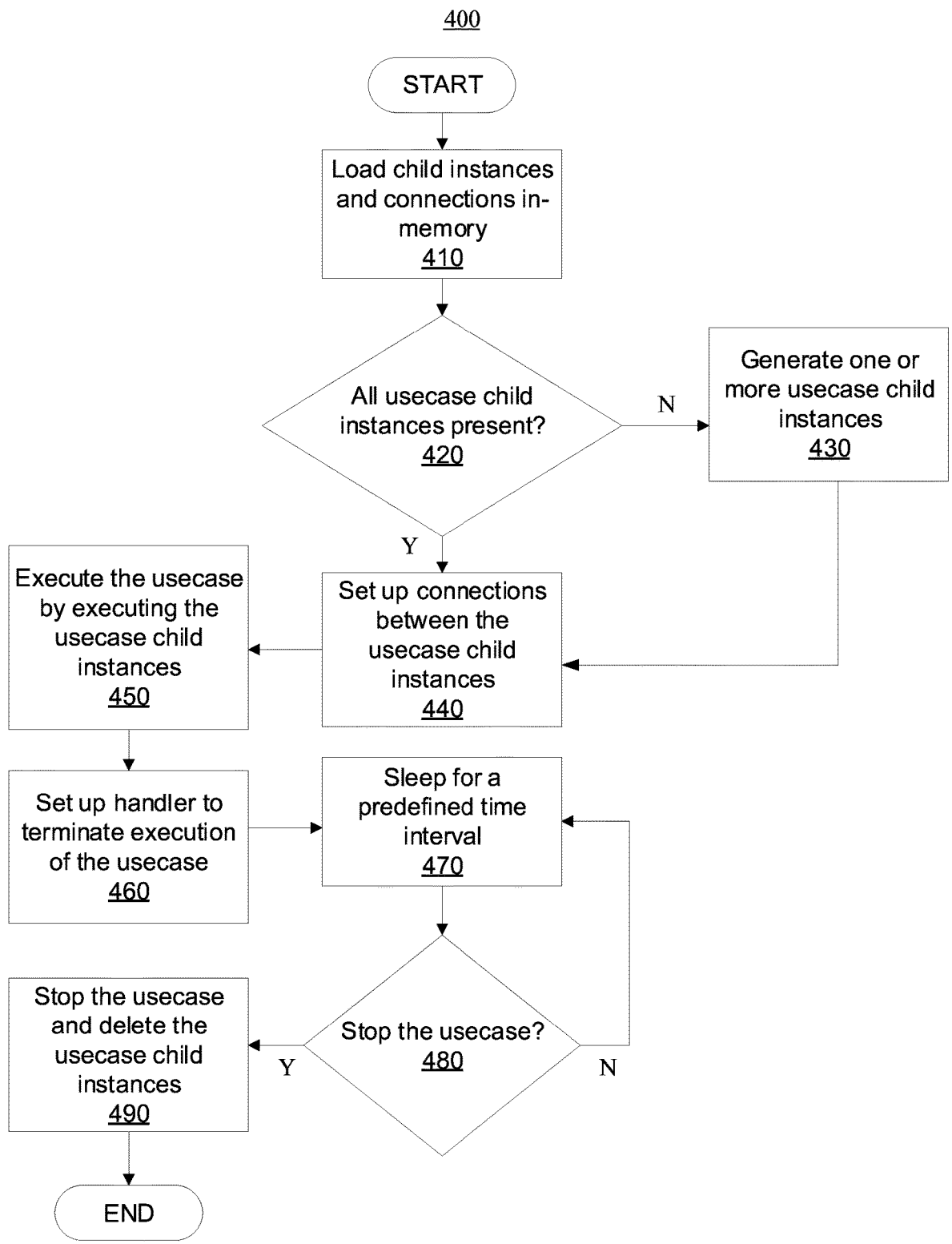
FIG. 4 is a block/flow diagram of a system/method for implementing a runtime usecase execution procedure, in accordance with an embodiment of the present invention.

With reference to FIG. 4, a block/flow diagram is provided illustrating a system/method 400 for managing execution of a usecase at runtime to perform a task. A runtime system, such as the runtime system 130 of FIG. 1, can build and execute the usecase using the usecase specification and usecase runtime specification corresponding to the usecase.

At block 410, once the runtime system receives the inputs, the application or child instances and their connections are read and loaded in-memory. After the instances and connections are loaded in-memory, the runtime system can begin to build the usecase for execution and generate the necessary child instances.

More specifically, building the usecase can include obtaining usecase child instances for building the usecase. The system/method 400 can reuse existing usecase child instances if the configuration of instances matches with an existing instance of the application, if the configuration of the instances matches the node/machine on which they should run, etc. Thus, at block 420, it is determined whether all usecase child instances are present. For example, the runtime system can check a database for any previously generated child instances that already exist for the usecase. This can be part of fault tolerance provided by the runtime system in the event of abrupt disruption of usecase execution. More specifically, in response to the execution of the usecase abruptly stopping or failing (e.g., power goes down), then, when the runtime system comes back up, the runtime system does not need to generate duplicate child instances. Instead, the runtime system can resume operation by reusing previously existing child instances.

If all the usecase child instances are present, no child instances need to be generated. Otherwise, the runtime system can generate one or more usecase child instances at block 430. The usecase child instances can be generated at block 430 by iterating over all the usecase child instances and generating them one-by-one. Further details regarding the generation of usecase child instances at block 430 will now be described below with reference to FIG. 5.

Figure 5:
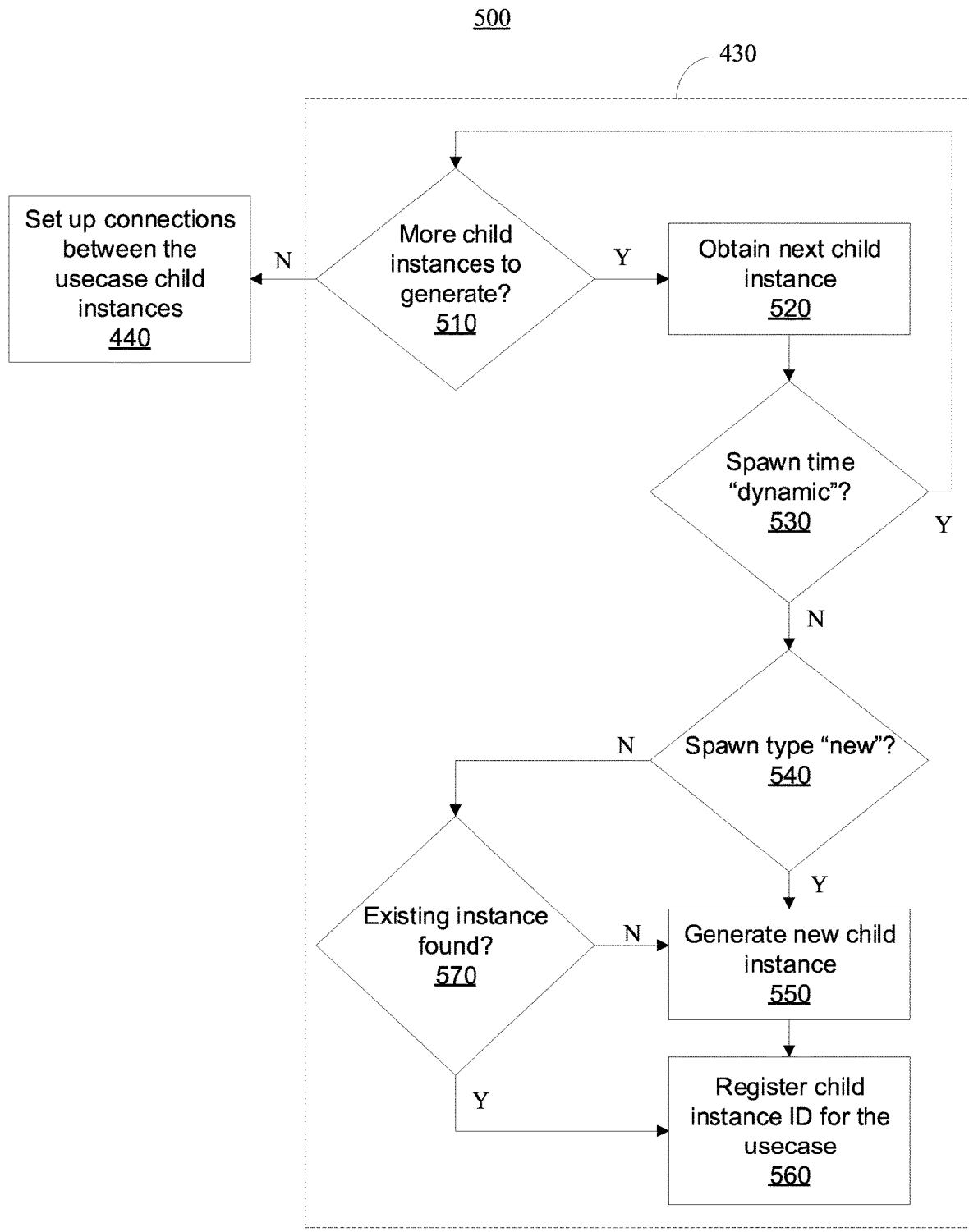
FIG. 5 is a block/flow diagram of a system/method for generating child instances during runtime execution, in accordance with an embodiment of the present invention.

With reference to FIG. 5, a block/flow diagram is provided illustrating an exemplary system/method 500 for generating usecase child instances at block 430 of FIG. 3.

At block 510, the runtime system determines whether there are more child instances to generate. For example, the runtime system can check in a database if the child instances were generated previously and already exist for the usecase. If not, connections between the child instances are set up at block 440, as described above with reference to FIG. 4.

Otherwise, at block 520, a next child instance is obtained and, at block 530, the runtime system determines whether the spawn type of the next child instance is "dynamic". If so, the generation of the next child instance is skipped, and the process reverts back to block 510 to determine if any other child instances are left to generate.

Otherwise, at block 540, the runtime system determines whether the spawn type of the next child instance is "new". If so, the runtime system generates a new child instance for the next child instance at block 550 and registers the child instance ID for the usecase at block 560. The child instance ID can be registered in the database for the usecase.

If the spawn type is not "new", the runtime system determines if an instance that can be used already exists at block 570.

If the spawn type is "reuse", then the runtime system can check if there is another existing instance of this application with the same configuration required by this instance. If so, then it uses that instance.

If the spawn type is "uniqueSiteWide", then the runtime system checks if another instance of this application already exists. If so, it reuses that instance.

If the spawn type is "uniqueNodeWide", then the runtime system can check if there is already an instance of this application with the same configuration on the node/machine that the instance is supposed to run on. If there is one, then the runtime system uses that instance.

The runtime system can then register the child instance ID for the usecase at block 560.

If an existing instance of this application is not found, the runtime system can generate a new child instance for the next child instance at block 550 and register the child instance ID for the usecase at block 560.

The process of FIG. 5 can be iterated until there are no more child instances to be generated.

Referring back to FIG. 4, after block 420 or block 430, connections between the child instances can be set up at block 440 by stitching the usecase child instances together so that they can talk to each other. The runtime system can iterate over all the connections and set the connections one-by-one. After the connections are set up at block 440, the runtime system may execute the usecase by executing the usecase child instances at block 450. Since the usecase child instances are connected and thus work together and talk to each other, each usecase child instance may start producing its result or output and can provide the output as an input to the connected usecase child instance, and the entire usecase can be set into action by the runtime system. Further details regarding the setting up of connections between the usecase child instances at block 440 will be described below with reference to FIG. 6.

Figure 6:
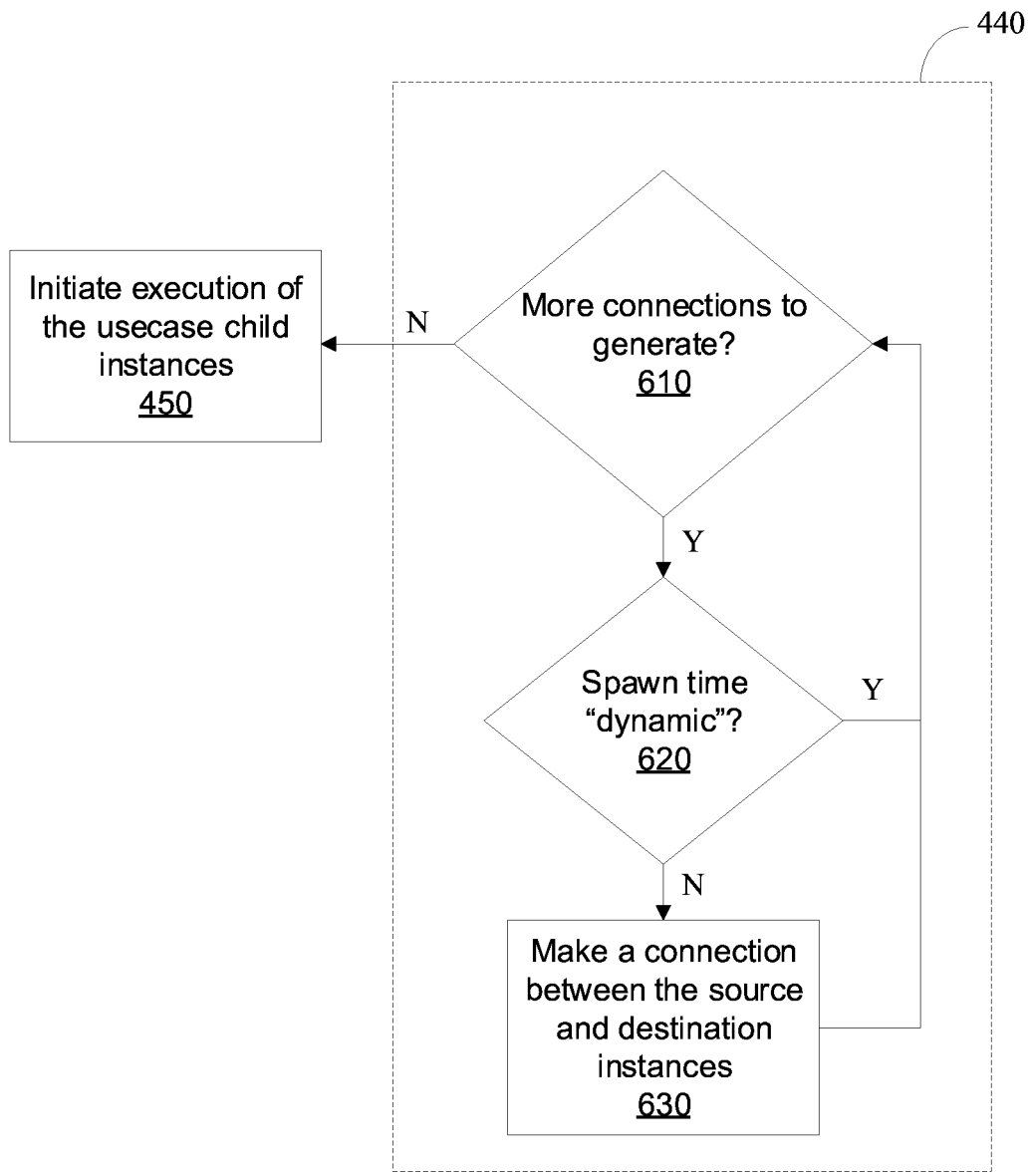
FIG. 6 is a block/flow diagram of a system/method for setting up connections during runtime execution, in accordance with an embodiment of the present invention.

With reference to FIG. 6, a block/flow diagram is provided illustrating an exemplary system/method 600 for setting up connections between the usecase child instances at block 440 of FIG. 4.

At block 610, it is determined if there are more connections to generate. If not, execution of the usecase child instances is initiated at block 450, as described above with reference to FIG. 4.

Otherwise, at block 620, it is determined whether the source/destination instance for the connection has a spawn type of "dynamic". If so, then the connection is skipped and the process reverts back to block 610 to determine if there is a next connection to generate.

If the spawn type is not "dynamic", then the runtime system can make a connection between the source and destination instances at block 630. While making the connection, the runtime system can check whether the source/destination binds and then make the connection accordingly. The instance name and endpoint name from the usecase specification may be used by the runtime system while making the connection between the source and destination instances.

Referring back to FIG. 4, at block 460, the runtime system sets up a handler to terminate execution of the usecase. The handler is set up to receive a signal to stop the usecase. For example, the handler can be set up to receive a signal including a SIGTERM signal. A SIGTERM signal is a generic signal that can be sent to a process to request its termination. Unlike a SIGKILL signal, which immediately terminates or kills a process, the SIGTERM signal can be blocked, handled and ignored by the process.

At block 470, the runtime system is put to sleep for a predefined time interval. The predefined time interval can be initially set as a default time interval, and may be configurable and set by the user. The predefined time interval can be on the order of seconds. For example, the default time interval can be set at, e.g., 10 seconds.

After the runtime system wakes up after the predefined time interval, at block 480, the runtime system determines whether it should stop the usecase. More specifically, the runtime system determines whether it has received the signal to stop the usecase.

If the runtime system determines that it should stop the usecase instance, the runtime system can stop the usecase and delete the child instances at block 490, and the process ends. Stopping the child instances may include deleting the child instances. Otherwise, the process can revert back to block 470 to put the runtime system to sleep for a predefined time interval (which could be the same or different from the previously defined predefined time interval).

Figure 7:
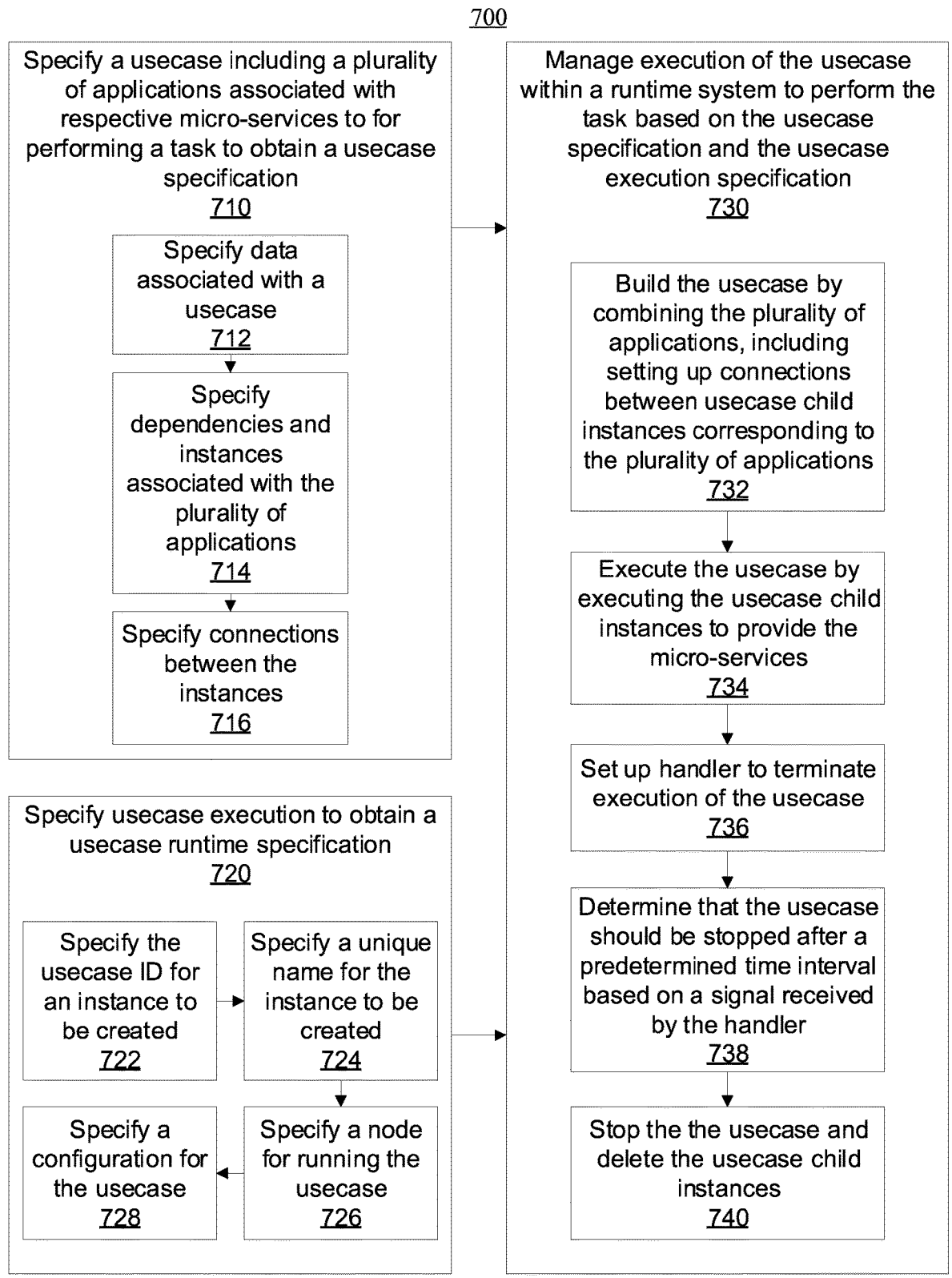
FIG. 7 is a block/flow diagram of a system/method for specifying a usecase, specifying usecase execution, and managing usecase execution, in accordance with an embodiment of the present invention.

With reference to FIG. 7, a block/flow diagram is provided illustrating a system/method 700 for specifying a usecase, specifying usecase execution, and implementing a runtime usecase execution procedure.

At block 710, a usecase including a plurality of applications associated with respective micro-services is specified for performing a task to obtain a usecase specification. Each micro-service can provide a corresponding functionality within the usecase to perform a task. The usecase specification can be used to identify various applications, their instances and connections that need to be made across various instances for the entire usecase to build and run. Each application can be associated with a set of application metadata. The set of application metadata can include an application ID that internally refers to the application, and an application version that corresponds to the version of the application that is used as part of the usecase. An instance of an application is what actually runs and provides the corresponding micro-service for which the application is designed. There can be a plurality of instances of an application, if the usecase requires them. Each instance of an application can act upon different input data. One of a plurality of spawn types can be specified for an instance. Non-limiting examples of spawn types that can be specified for an instance include "New", "Reuse", "Dynamic", "UniqueSiteWide", and "UniqueNodeWide".

More specifically, specifying the usecase may include, at block 712, specifying data associated with a usecase. The data associated with the usecase may include an identifier (ID), a name and other metadata associated with the usecase. The usecase ID can be used internally to refer to the usecase, which can include a plurality of applications. The other metadata can include the version number of the usecase, any description associated with the usecase, a universal resource identifier (URI) or universal resource locator (URL) where more details related to the usecase can be found, the operating system (OS) and architecture on which the usecase runs, the maintainer of the usecase, and any other relevant metadata pertaining to the usecase.

Specifying the usecase may further include, at block 714, specifying dependencies and instances associated with the plurality of applications and, at block 716, specifying connections between the instances. The connections can define the way micro-services connect and talk to each other, such that output provided by a particular micro-service is passed on as input to the next micro-service. Various micro-services may be connected, and a topology of these micro-services may be generated, thereby forming the entire usecase.

Each connection can be associated with a set of connection metadata. The set of connection metadata can include a source instance, a destination instance, and binding information. Communication between instances may be done over a suitable message queue and/or over APIs (e.g., HTTP(S)-based RESTful APIs), where the binding information can tell the runtime system which instance binds and which instance needs to connect and obtain the necessary input data.

The usecase specification can be used as an input to compile the usecase and generate a binary package of the usecase. To generate the binary package, each application in the usecase can be compiled one-by-one to generate its binary package based on the set of application metadata (e.g., application ID and application version).

A unified configuration of the usecase can be generated as a combination of the configuration of each instance to be launched in runtime based on the set of instance metadata (e.g., instance name, application ID and spawn type).

A sample configuration of the usecase can be generated as a combination of the sample configuration of each instance to be launched in runtime based on the set of instance metadata (e.g., instance name, application ID and spawn type).

A package of the usecase including the binary packages, unified configuration and the sample configuration can be generated.

Further details regarding blocks 710-716 are described above with reference to FIG. 2.

At block 720, a usecase execution is specified to obtain a usecase runtime specification. The specification of the usecase execution can be based on the usecase specification.

More specifically, specifying the usecase execution may include, at block 722, specifying the usecase ID for an instance to be generated.

Specifying the usecase execution may further include, at block 724, specifying a unique name for the instance to be generated.

Specifying the usecase execution may further include, at block 726, specifying a node for running the usecase.

Specifying the usecase execution may further include, at block 728, specifying a configuration for the usecase. More specifically, the configuration can be associated with the configuration for each instance belonging to the usecase. For example, the configuration of each instance can be based on a set of configuration metadata include the instance name, the node on which the instance needs to be started, and the configuration of the instance itself.

Further details regarding blocks 720-728 are described above with reference to FIG. 3

At block 730, execution of the usecase within a runtime system is managed to perform the task based on the usecase specification and the usecase runtime specification. Using the usecase and usecase runtime specifications, a runtime system can obtain information including, but not limited to, which applications constitute the usecase, how many and which instances of the applications are to be created and started, what are the instance configurations, where to run the instances and what are the connections between the various instances.

More specifically, managing execution of the usecase may include, at block 732, building the usecase by combining the plurality of applications, including setting up connections between usecase child instances corresponding to the plurality of applications.

In one embodiment, building the usecase can include obtaining the usecase child instances. Obtaining the child instances can include loading child instances and connections between the child instances in-memory, and determining whether all the usecase child instances are present. If all the usecase child instances are present, no child instances need to be generated and thus connections between the present usecase child instances can be set up. Otherwise, one or more usecase child instances can be generated. The one or more usecase child instances can be generated based on spawn type (e.g., "dynamic", "new", "reuse", "uniqueSiteWide", "uniqueNodeWide").

The connections between the usecase child instances can be set up by stitching the child instances together so that they can talk to each other. The runtime system can be configured to iterate over all the connections and set the connections one-by-one. Moreover, the connections between the usecase child instances can be set up based on spawn type. For example, if the spawn type is "dynamic", the connection is skipped.

Managing execution of the usecase may further include, at block 734, executing the usecase by executing the usecase child instances to provide the micro-services. Since the child instances are connected and thus work together and talk to each other, each child instance may start producing its result or output and can provide the output as an input to the connected child instance. Accordingly, the entire usecase can be set into action by the runtime system.

Managing execution of the usecase may further include, at block 736, setting up a handler to terminate execution of the usecase and, at block 738, determining that the usecase should be stopped after a predefined time interval based on a signal received by the handler. For example, the runtime system can be put to sleep for a predetermined time interval and, after the runtime system wakes up, the runtime system can determine that it has received a signal to stop the usecase. In one embodiment, the signal received by the handler includes a SIGTERM. If the runtime system has received the signal, it will stop or terminate the usecase and delete the usecase child instances at block 740. Otherwise, the runtime system will go back to sleep for the predefined time interval.

Further details regarding blocks 730-740 are described above with reference to FIGS. 4-6.

The system/method 700 can be configured to control, generate and run only one instance of an application for entire site-wide deployment. Additionally, the system/method 700 can be configured to control, generate and run only one instance of an application on a particular node/machine.

The applications of the usecase can "talk" to each other and work together in order to solve a complex problem. This can be accomplished, at least in part, by reusing or sharing application instances. The determination of whether or not to reuse or share application instances can be made prior to, or as part of, the execution of the usecase at block 734. Further details regarding the reusing or sharing application instances will now be described below with reference to FIG. 8.

With reference to FIG. 8, a block/flow diagram is provided illustrating a system/method 800 for reusing or sharing application instances, in accordance with an embodiment of the present invention.

At block 810, a usecase specification and usecase runtime specification corresponding to a usecase are obtained, with the usecase including a plurality of applications each being associated with a micro-service providing a corresponding functionality within the usecase for performing a task. For example, the usecase specification and the usecase runtime specification can be obtained by specifying the usecase and the usecase runtime specification in accordance with the embodiments described above with reference to FIGS. 2, 3 and 7.

At block 820, it is determined that at least one existing instance of at least one of the plurality of applications can be reused during execution of the usecase based on the usecase specification and the usecase runtime specification.

In one embodiment, determining that the at least one instance can be reused during execution of the usecase include, at block 822, determining that an instance configuration from the specifications matches at least one existing instance of the plurality of applications.

In another embodiment, determining that the at least one instance can be reused during execution of the usecase includes, at block 824, determining that the instance configuration and an instance node/machine configuration from the specifications matches the at least one existing instance.

In yet another embodiment, determining that the at least one instance can be reused during execution of the usecase includes, at block 826, determining that an instance of the at least one application already exists.

At block 830, the at least one existing instance is reused during execution of the usecase. The usecase can be executed in accordance with the embodiments described herein above with reference to FIGS. 4-7.

An exemplary embodiment illustrating the system/method of FIG. 8 is described below with reference to FIG. 9.

The embodiments described herein can be employed within a variety of real-world environments to perform tasks or solve problems.

In one example, the embodiments described herein can be employed to reuse or share application instances within a facial recognition system for monitoring individuals in a watchlist based on image data (e.g., video streams) obtained from a camera. The facial recognition system can be configured to generate an alert when an individual has a face that matches facial data (e.g., pre-registered facial data) in the watchlist.

In another example, the embodiments described herein can be employed to reuse or share applications within an age and gender detection system to detect the age and gender of individuals based on image data (e.g., video streams) obtained from a camera.

Figure 9:
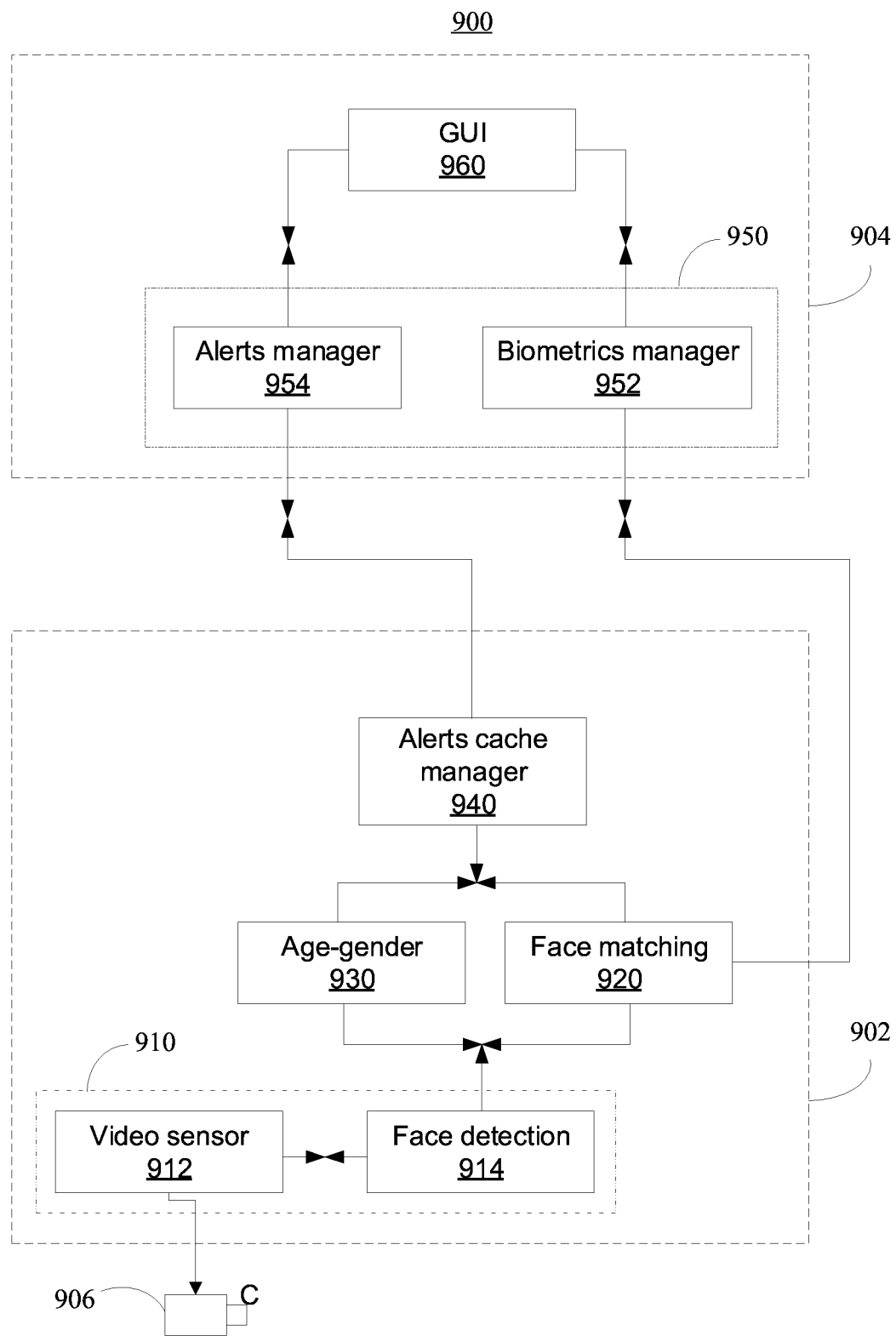
FIG. 9 is a block/flow diagram of an example of a system configured to reuse or share application instances, in accordance with an embodiment of the present invention.

With reference to FIG. 9, a block/flow diagram is provided illustrating an exemplary system 900 configured to reuse or share application instances. The system 900 in this illustrative example include a facial recognition system and an age and gender detection system each including a plurality of applications.

As shown, the system 900 can include a worker node 902, a master node 904 and an image capturing device 906 (e.g., a video camera). The worker node 902 and the master node 904 can each include a plurality of applications for performing facial recognition and/or age and gender detection based on images captured by the image capturing device 906.

More specifically, the worker node 902 can include a set of applications 910 including a video sensor application 912 in communication with a face detection application 914, a face matching application 920 and an age-gender application 930 each in communication with the face detection application 914, and an alerts cache manager 940 in communication with the face matching and age-gender applications 920 and 930.

Instances of the video sensor and face detection applications 912 and 914 have a spawn type "Reuse" and get shared since they have the same configuration. Instances of the face matching and age-gender applications 920 and 930 can have a "New" spawn type. An instance of the alerts cache manager 940 can have a "uniqueNodeWide" spawn type and gets shared because it has the same configuration and same worker node 902.

The worker node 902 can have more shared instances, if there are more usecases instances to run. Additionally, there could be multiple such workers in a deployment.

The master node 904 can include a set of applications 950 including a biometrics manager 952 in communication with the face matching application 920 and an alerts manager 954 in communication with the alerts cache manager 940, and a graphical user interface (GUI) application 960 in communication with the biometrics and alerts managers 952 and 954. Instances of the biometrics and alerts managers 952 and 954 have a "uniqueSiteWide" spawn type and thus get shared across site-wide deployment. An instance of the GUI application 960 can also have a "uniqueSiteWide" spawn type.

Thus, sharing of instances in the system 900 is happening at different levels. More specifically, sharing of instances is happening at the individual instance-level (e.g., video sensor and face detection applications 912 and 914), the individual worker-level (e.g., the alerts cache manager application 940) and the site-level (e.g., the alerts and biometrics managers 952 and 954.

In both the facial recognition and age-gender detection system embodiments, an instance of the video sensor application 912 retrieves frames from the device 906 and provides the frames as output (which exposes the endpoint with output frames). An instance of the face detection application 914 receives the frames output by the instance of the video sensor application 912, detects faces in the frames, and outputs the faces (which exposes the endpoint with detected faces).

In the facial recognition system, an instance of the biometrics manager application 952 maintains watchlist information including names and pictures of people to be monitored/watched (which exposes the endpoint to manage the watchlist). An instance of the face matching application 920 receives the faces output by the instance of the face detection application 914, and matches the detected faces with a watchlist (e.g., by loading the watchlist information in-memory), and outputs matched face information. An instance of the alerts cache manager 940 (which exposes the endpoint to manage local alerts on the worker node 904) receives the matched face information output by the instance of the face matching application 920, connects to the alerts manager 954 to post all alerts on the worker node 904, maintains the alerts in cache and retries if there is no network activity while posting alerts. The alerts manager 954 (which exposes the endpoint to manage site-wide alerts) maintains matched alerts information.

In the age and gender detection system, an instance of the age-gender application 930 receives the detected faces, detects age and gender, and outputs the age and gender information. The alerts cache manager 940 (which exposes the endpoint to manage local alerts on the worker node 904) receives the age and gender information output by the instance of the age-gender application 930, connects to the alerts manager 954 to post all alerts on the worker node 904, maintains the alerts in cache and retries if there is no network activity while posting alerts.

In both the facial recognition and the age and gender detection systems, an instance of the GUI application 960 retrieves information from the instances of the biometrics manager 952 and/or the alerts managers 954, and can display real-time results to one or more end-users.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
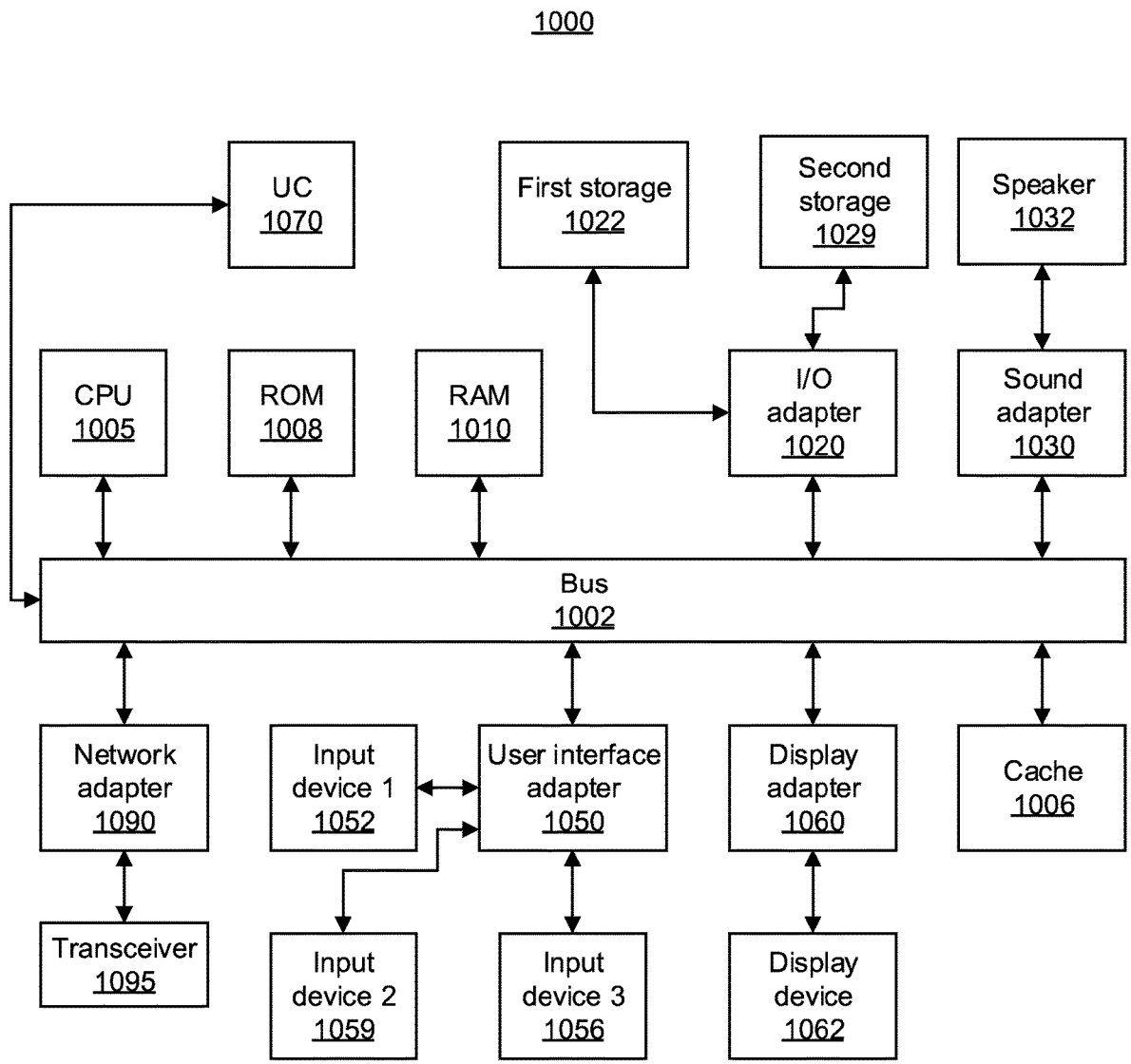
FIG. 10 is a block/flow diagram illustrating a computer system, in accordance with an embodiment of the present invention.

Referring now to FIG. 10, an exemplary computer system 1000 is shown which may represent a server or a network device, in accordance with an embodiment of the present invention. The computer system 1000 includes at least one processor (CPU) 1005 operatively coupled to other components via a system bus 1002. A cache 1006, a Read Only Memory (ROM) 1008, a Random-Access Memory (RAM) 1010, an input/output (I/O) adapter 1020, a sound adapter 1030, a network adapter 1090, a user interface adapter 1050, and a display adapter 1060, are operatively coupled to the system bus 1002.

A first storage device 1022 and a second storage device 1029 are operatively coupled to system bus 1002 by the I/O adapter 1020. The storage devices 1022 and 1029 can be any of a disk storage device (e.g., a magnetic or optical disk storage device), a solid state magnetic device, and so forth. The storage devices 1022 and 1029 can be the same type of storage device or different types of storage devices.

A speaker 1032 may be operatively coupled to system bus 1002 by the sound adapter 1030. A transceiver 1095 is operatively coupled to system bus 1002 by network adapter 1090. A display device 1062 is operatively coupled to system bus 1002 by display adapter 1060.

A first user input device 1052, a second user input device 1059, and a third user input device 1056 are operatively coupled to system bus 1002 by user interface adapter 1050. The user input devices 1052, 1059, and 1056 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1052, 1059, and 1056 can be the same type of user input device or different types of user input devices. The user input devices 1052, 1059, and 1056 are used to input and output information to and from system 1000.

Usecase (UC) component 1070 may be operatively coupled to system bus 1002. UC component 1070 is configured to perform one or more of the operations described above. UC component 1070 can be implemented as a standalone special purpose hardware device, or may be implemented as software stored on a storage device. In the embodiment in which UC component 1070 is software-implemented, although shown as a separate component of the computer system 1000, UC component 1070 can be stored on, e.g., the first storage device 1022 and/or the second storage device 1029. Alternatively, UC component 1070 can be stored on a separate storage device (not shown).

Of course, the computer system 1000 may also include other elements (not shown), as readily contemplated by one of skill in the art, as well as omit certain elements. For example, various other input devices and/or output devices can be included in computer system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1000 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method comprising:
   obtaining a usecase specification and a usecase runtime specification corresponding to the usecase, the usecase including a plurality of applications each being associated with a micro-service providing a corresponding functionality within the usecase for performing a task;
determining that at least one instance of the at least one of the plurality of applications can be reused during execution of the usecase based on the usecase specification and the usecase runtime specification;
reusing the at least one instance during execution of the usecase;
managing execution of the usecase within a runtime system to perform the task based on the usecase specification and the usecase runtime specification, including:
building the usecase by combining the plurality of applications, including setting up connections between usecase child instances corresponding to the plurality of applications;
executing the usecase, including executing the usecase child instances to provide the micro-services;
setting up a handler for terminating execution of the usecase;
determining that the usecase should be stopped after a predetermined time interval based on a signal received by the handler; and
stopping the usecase; and
obtaining the usecase child instances, including:
loading child instances and connections between the child instances in-memory, the connections between child instances being set up based on spawn type;
determining that all the usecase child instances are not present in-memory;
generating one or more child instances that are not present in-memory based on spawn type;
wherein determining that the usecase should be stopped after a predetermined time interval further includes:
putting the runtime system to sleep for the predetermined time interval; and
determining that the handler has received the signal to stop the usecase after the runtime system wakes up.

2. The method of claim 1, wherein:
obtaining the usecase specification further includes specifying the usecase by specifying:
data associated with the usecase, the data associated with the usecase including a usecase identifier, a usecase name and usecase metadata;
application dependencies and application instances; and
instance connections; and
obtaining the usecase runtime specification further includes specifying usecase execution by specifying:
the usecase identifier;
an instance name;
a usecase node/machine; and
a usecase configuration.

3. The method of claim 1, wherein determining that the at least one instance that can be reused during execution of the usecase further includes determining that an instance configuration from the specifications matches at least one existing instance of the plurality of applications.

4. The method of claim 1, wherein determining that the at least one instance that can be reused during execution of the usecase further includes determining that the instance configuration and an instance node/machine configuration from the specifications matches at least one existing instance of the plurality of applications.

5. The method of claim 1, wherein determining that the at least one instance that can be reused during execution of the usecase further includes determining that the at least one instance of the at least one application already exists.

6. The method of claim 1, wherein managing execution of the usecase further includes, in response to execution of the usecase abruptly failing, resuming operation by reusing previously existing child instances.

7. A computer program product comprising a non-transitory computer readable storage medium having program instructions embodied therewith, the program instructions executable by a computer to cause the computer to perform a method comprising:
obtaining a usecase specification and a usecase runtime specification corresponding to the usecase, the usecase including a plurality of applications each being associated with a micro-service providing a corresponding functionality within the usecase for performing a task;
determining that at least one instance of the at least one of the plurality of applications can be reused during execution of the usecase based on the usecase specification and the usecase runtime specification;
reusing the at least one instance during execution of the usecase;
managing execution of the usecase within a runtime system to perform the task based on the usecase specification and the usecase runtime specification, including:
building the usecase by combining the plurality of applications, including setting up connections between usecase child instances corresponding to the plurality of applications;
executing the usecase, including executing the usecase child instances to provide the micro-services;
setting up a handler for terminating execution of the usecase;
determining that the usecase should be stopped after a predetermined time interval based on a signal received by the handler; and
stopping the usecase; and
obtaining the usecase child instances, including:
loading child instances and connections between the child instances in-memory, the connections between child instances being set up based on spawn type;
determining that all the usecase child instances are not present in-memory; and
generating one or more child instances that are not present in-memory based on spawn type;
wherein determining that the usecase should be stopped after a predetermined time interval further includes:
putting the runtime system to sleep for the predetermined time interval; and
determining that the handler has received the signal to stop the usecase after the runtime system wakes up.

8. The computer program product of claim 7, wherein:
obtaining the usecase specification further includes specifying the usecase by specifying:
data associated with the usecase, the data associated with the usecase including a usecase identifier, a usecase name and usecase metadata;
application dependencies and application instances; and
instance connections; and
obtaining the usecase runtime specification further includes specifying usecase execution by specifying:
the usecase identifier;

an instance name;
a usecase node/machine; and
a usecase configuration.

9. The computer program product of claim 7, wherein determining that the at least one instance that can be reused during execution of the usecase further includes determining that an instance configuration from the specifications matches at least one existing instance of the plurality of applications.

10. The computer program product of claim 7, wherein determining that the at least one instance that can be reused during execution of the usecase further includes determining that the instance configuration and an instance node/machine configuration from the specifications matches at least one existing instance of the plurality of applications.

11. The computer program product of claim 7, wherein determining that the at least one instance that can be reused during execution of the usecase further includes determining that the at least one instance of the at least one application already exists.

12. The computer program product of claim 7, wherein managing execution of the usecase further includes, in response to execution of the usecase abruptly failing, resuming operation by reusing previously existing child instances.

13. A system comprising:
a memory device for storing program code; and
at least one processor device operatively coupled to a memory device and configured to execute program code stored on the memory device to:
obtain a usecase specification and a usecase runtime specification corresponding to the usecase, the usecase including a plurality of applications each being associated with a micro-service providing a corresponding functionality within the usecase for performing a task;
determine that at least one instance of the at least one of the plurality of applications can be reused during execution of the usecase based on the usecase specification and the usecase runtime specification; and
reuse the at least one instance during execution of the usecase;
wherein the at least one processing device is further configured to execute program code stored on the memory device to managing execution of the usecase within a runtime system to perform the task based on the usecase specification and the usecase runtime specification by:
building the usecase by combining the plurality of applications, including setting up connections between usecase child instances corresponding to the plurality of applications;
executing the usecase, including executing the usecase child instances to provide the micro-services;
setting up a handler for terminating execution of the usecase;
determining that the usecase should be stopped after a predetermined time interval based on a signal received by the handler, including putting the runtime system to sleep for the predetermined time interval, and determining that the handler has received the signal to stop the usecase after the runtime system wakes up; and
stopping the usecase.

14. The system of claim 13, wherein the at least one processor device is further configured to:
obtain the usecase specification by specifying:
data associated with the usecase, the data associated with the usecase including a usecase identifier, a usecase name and usecase metadata;
application dependencies and application instances; and
instance connections; and
obtain the usecase runtime specification by specifying:
the usecase identifier;
an instance name;
a usecase node/machine; and
a usecase configuration.

15. The system of claim 13, wherein the at least one processor device is further configured to manage execution of the usecase by, in response to execution of the usecase abruptly failing, resuming operation by reusing previously existing child instances.

* * * * *